(12) United States Patent
Heim et al.

(10) Patent No.: US 9,944,474 B2
(45) Date of Patent: Apr. 17, 2018

(54) ADJUSTABLE LATERAL SEALS FOR DOCK WEATHER BARRIERS

(71) Applicants: Frank Heim, Platteville, WI (US);
Ryan Withrow, Platteville, WI (US)

(72) Inventors: Frank Heim, Platteville, WI (US);
Ryan Withrow, Platteville, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 15/238,384

(22) Filed: Aug. 16, 2016

(65) Prior Publication Data
US 2018/0050877 A1 Feb. 22, 2018

(51) Int. Cl.
*E04D 13/18* (2014.01)
*B65G 69/00* (2006.01)

(52) U.S. Cl.
CPC .................. *B65G 69/008* (2013.01)

(58) Field of Classification Search
CPC .................................................... B65G 69/008
(Continued)

(56) References Cited

U.S. PATENT DOCUMENTS 3,230,675 A * 1/1966 Frommelt ............ B65G 69/008
267/144
3,375,625 A * 4/1968 Edkins ................. B65G 69/008
52/173.2

(Continued)

FOREIGN PATENT DOCUMENTS

WO 2007129631 11/2007
WO 2014125040 8/2014

OTHER PUBLICATIONS

International Searching Authority, "International Search Report," issued in connection with International Patent Application PCT No. PCT/US2017/046707, dated Nov. 21, 2017, 5 pages.
(Continued)

*Primary Examiner* — Basil S Katcheves
*Assistant Examiner* — Joshua K Ihezie
(74) *Attorney, Agent, or Firm* — Hanley, Flight & Zimmerman, LLC

(57) ABSTRACT

Adjustable lateral seals for loading dock barriers are disclosed. An example barrier includes a header structure coupled to the wall, where the header structure is horizontally elongate, extending above the doorway, and protrudes in the forward direction from the wall. A lateral seal is coupled to the wall. The lateral seal is vertically elongate and extends below the header structure. The lateral seal extends farther into a cargo passageway of a loading dock when the weather barrier is in a relaxed configuration than when the weather barrier is in an activated configuration. The lateral seal is to be engage by a vehicle when the vehicle is in a parked position. The lateral seal including an upper seal segment and a lower seal segment, the upper seal segment to move between a lowered position and a raised position relative to the lower seal segment. A flexible elongate member has an upper end coupled to the header structure and a lower end coupled to the upper seal segment. The flexible elongate member is to deflect from a relaxed position to a deflected position. The upper seal segment to move from the lowered position to the raised position in response to the flexible elongate member deflecting from the relaxed position to the deflected position.

26 Claims, 11 Drawing Sheets

(58) Field of Classification Search
USPC .................................................. 52/173.2, 71
See application file for complete search history.

(56) References Cited

U.S. PATENT DOCUMENTS

| | | | | |
|---|---|---|---|---|
| 3,653,173 | A * | 4/1972 | Frommelt | B65G 69/008 135/115 |
| 3,875,954 | A | 4/1975 | Frommelt et al. | |
| 4,494,341 | A * | 1/1985 | Schwab | B65G 69/008 160/191 |
| 4,554,768 | A * | 11/1985 | Srajer | B65G 69/008 160/243 |
| 4,805,362 | A | 2/1989 | Frommelt et al. | |
| 5,185,977 | A | 2/1993 | Brockman et al. | |
| 5,341,613 | A | 8/1994 | Brockman et al. | |
| 5,394,662 | A | 3/1995 | Giuliani et al. | |
| 5,953,868 | A | 9/1999 | Giuliani et al. | |
| 6,854,224 | B2 * | 2/2005 | Thill | B65G 69/008 52/173.2 |
| 2002/0112418 | A1 * | 8/2002 | Thill | B65G 69/008 52/173.2 |
| 2006/0026912 | A1 | 2/2006 | Eungard et al. | |
| 2006/0032159 | A1 | 2/2006 | Eungard et al. | |
| 2006/0090407 | A1 | 5/2006 | Hoffmann et al. | |
| 2015/0007509 | A1 * | 1/2015 | Digmann | B65G 69/008 52/173.2 |
| 2015/0007511 | A1 * | 1/2015 | Digmann | E04H 14/00 52/173.2 |

OTHER PUBLICATIONS

International Searching Authority, "Written Opinion," issued in connection with International Patent Application PCT No. PCT/US2017/046707, dated Nov. 21, 2017, 7 pages.

* cited by examiner

FIG. 10
FIG. 11
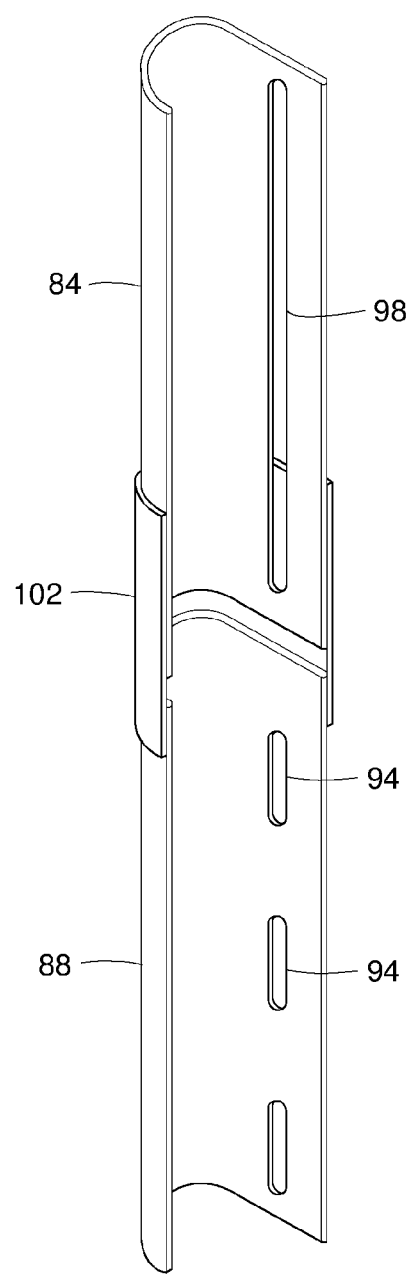
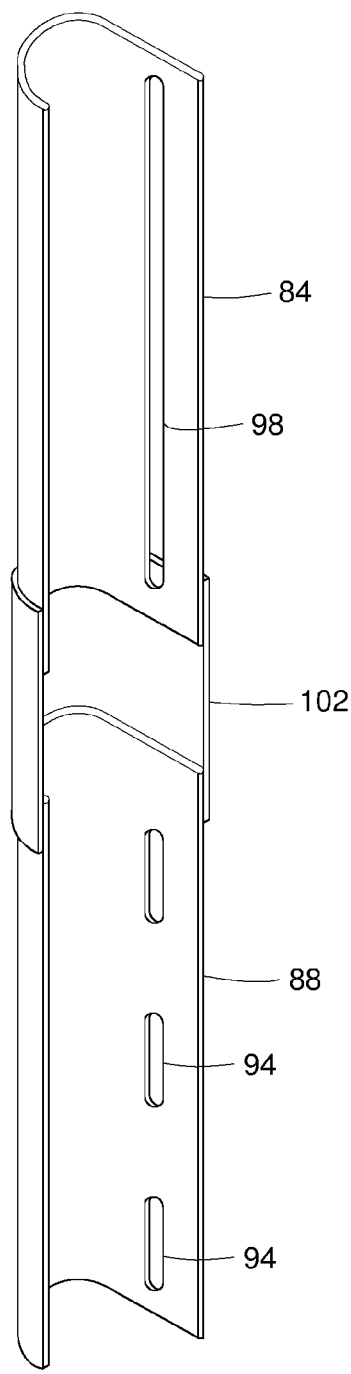

ADJUSTABLE LATERAL SEALS FOR DOCK WEATHER BARRIERS

FIELD OF THE DISCLOSURE

The present disclosure relates generally to vehicle-engaging seals and, more specifically, to adjustable lateral seals for dock weather barriers.

BACKGROUND

Dock weather barriers, such as dock seals and dock shelters, prevent or restrict the ingress of outdoor environmental conditions or contaminants (e.g., rain, snow, wind, hot/cold temperatures, insects, animals, etc.) into the interior of a building and cargo area of a vehicle during the loading or unloading of the vehicle. Dock shelters and seals also prevent or restrict the egress of conditioned air from within a building and/or a vehicle cargo area to the outdoor environment.

BRIEF DESCRIPTION OF THE DRAWINGS

FIG. 10 is a perspective view similar to FIG. 8, but showing another example of seal segments constructed in accordance with the teachings disclosed herein.

FIG. 11 is a perspective view similar to FIG. 9, but showing the example seal segments of FIG. 10.

DETAILED DESCRIPTION

Figure 1:
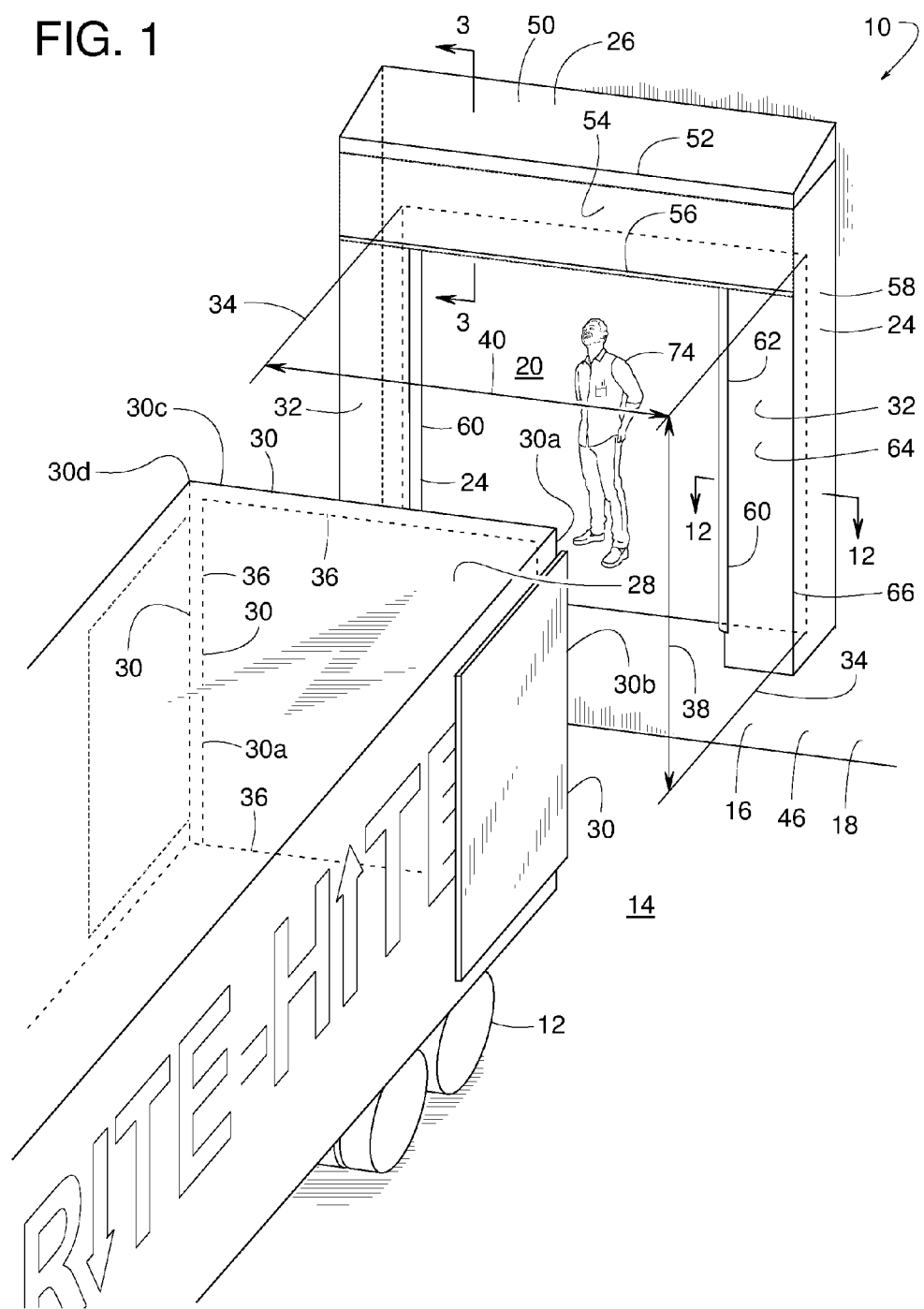
FIG. 1 is a perspective view of an example weather barrier constructed in accordance with the teachings disclosed herein. The example weather barrier apparatus of FIG. 1 is shown in a relaxed configuration.
Figure 2:
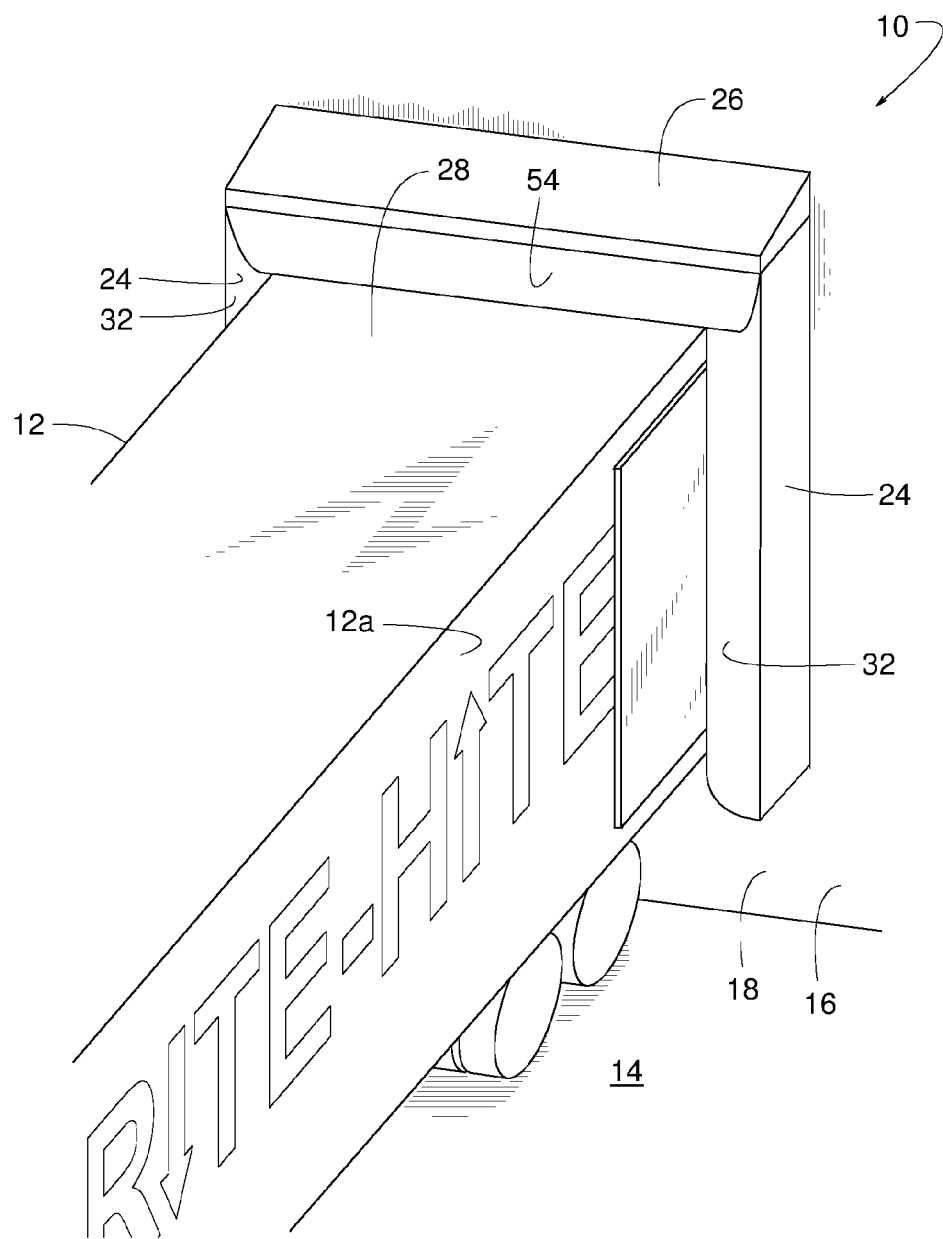
FIG. 2 is a perspective view similar to FIG. 1, but showing the example weather barrier in an activated configuration.
Figure 3:
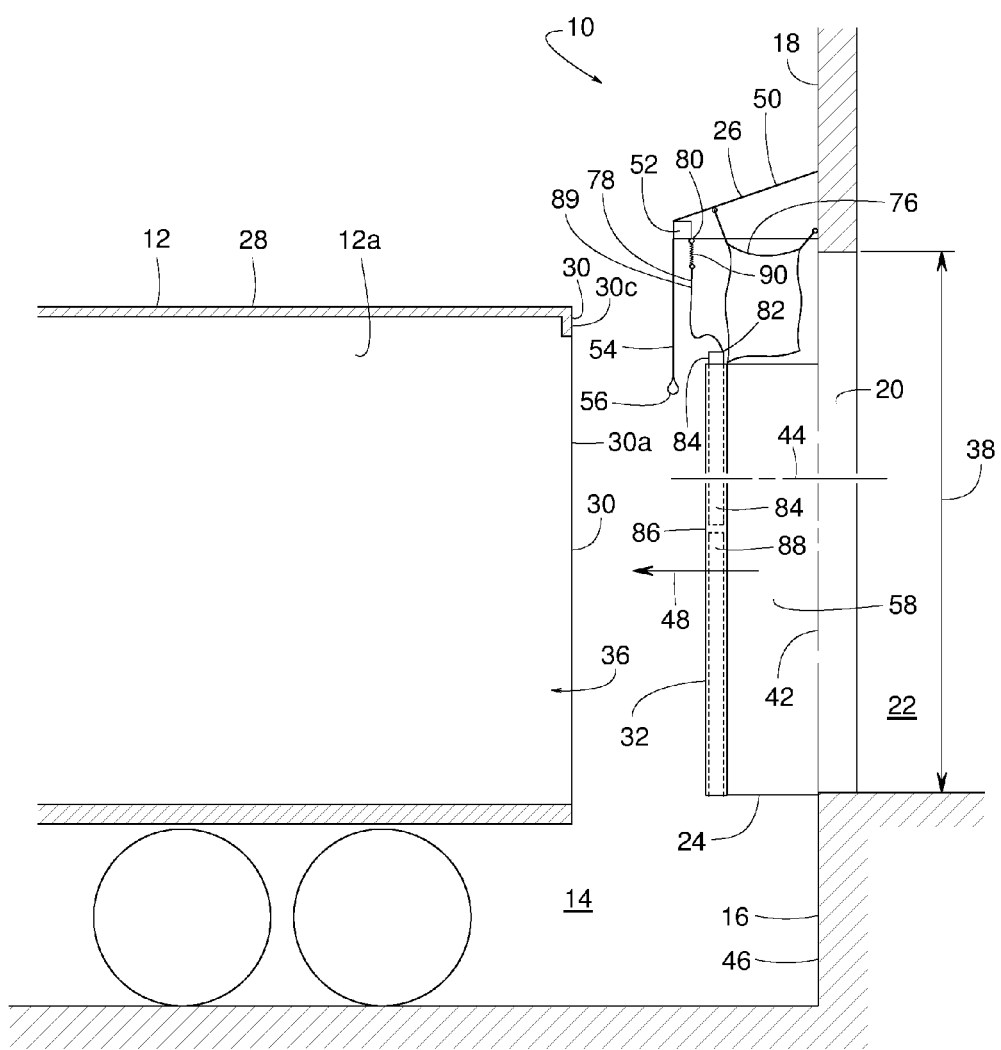
FIG. 3 is a cross-sectional view taken along line 3-3 of FIG. 1.

Some dock seals use side members having a compressible foam core or body surrounded by a coated fabric or vinyl outer layer. The foam core provides sufficient structural rigidity to enable the side members to be extended a short distance from the building wall surrounding the loading dock. The coated fabric outer layer protects the foam core from outdoor environmental conditions (e.g., moisture), provides wear resistance to repeated impacts from the rear portions of vehicles, and may provide desirable aesthetic qualities. Additionally, a header structure may span between the side members along a top portion of the loading dock opening. The header structure may be another compressible member similar in construction to the side members and, in some cases, may include a weighted fabric curtain that hangs downwardly to contact the top of a truck trailer to form an environmental barrier along the top of the trailer.

Another type of dock seal uses inflatable side members and a header structure having internal compressible resilient pads, which provide some degree of side member compressibility when the side members are in a deflated condition. In either case, when the rear portion of a vehicle (e.g., a truck trailer) backs into either foam or inflatable dock seal side and header members, the side and header members are compressed toward the building wall to form a seal along the lateral and top back edges of the vehicle. If present, the head curtain sweeps along the top of the trailer to form a seal at the top of the trailer between the side members. Dock seals typically consume a relatively small amount of wall space and can provide a relatively high quality seal between the rear edges of a vehicle and the outside building wall surrounding the dock. However, when the dock seal side members are compressed, they may be displaced into or otherwise encroach on the opening to the rear of the docked vehicle. As a result, the compressed side member may interfere with operation of a fork lift and/or an operator during loading and unloading activities. In addition, inflatable dock seals are susceptible to power losses and tears that compromise the ability of the side members to inflate to provide an acceptable seal.

In contrast to dock seals, some known dock shelters use side members that are mounted to the outside building wall surrounding the loading dock. The side members are spaced well to the outside of the sides of a docked vehicle. The side members are configured to extend (i.e., to be cantilevered) an appreciable distance from the outside building wall, particularly in cases where a dock leveler protrudes from the dock opening. The side members may also support flexible seal members or side curtains extending inwardly from the side members across at least a portion of the opening defined by the side members. When a vehicle such as, for example, a truck trailer, is backed into the opening of the dock shelter, the inwardly facing edges of the seal members or side curtains resiliently deflect and sweep against the lateral sides of the trailer to form an environmental barrier therebetween. As with dock seals, dock shelters also typically include a header structure, which may include a head curtain, to form an environmental barrier along the top edge of the rear of the vehicle.

In contrast to dock seals, dock shelters typically provide unobstructed access to a vehicle cargo area opening (i.e., there are no foam pads or the like to be compressed and displaced into the opening). However, most known dock shelter side members are constructed using rigid wood, fiberglass or metal frames capable of supporting the significant weight of the seal members or side curtains, which are usually held at an appreciable distance (e.g., several feet) from the building wall. Such side members may be permanently deformed if they are impacted by a vehicle. Accordingly, bumpers or stops may be mounted to the lower edge of the dock shelter to prevent a vehicle (e.g., a truck trailer) from impacting and damaging the rigid shelter.

The rigid side members used to implement some dock shelters are also typically mechanically coupled via the header and/or another rigid member to provide increased lateral rigidity to the dock shelter to reduce (e.g., minimize) the ability of the side members to move from side-to-side.

Because of this, the side members typically have to be mounted relatively far apart to accommodate a wide range of possible off-center vehicle positions. This relatively large distance between the rigid side members consumes a significant and, thus, expensive amount of building wall space for each loading dock opening.

Some dock shelters have impactable side members. The impactable side members are similar to those used with dock seals and typically use a foam core or body surrounded by a coated fabric outer layer. Seal members or side curtains, which may be constructed using a fabric and flexible fiberglass stays combination or a foam core and fabric combination, are typically mounted to the side members to extend at least partially across the shelter opening. When a vehicle is backed into the shelter, the inwardly facing edges of the seal members or side curtains deflect and sweep against the sides of the vehicle to form an environmental barrier or seal against the sides of the vehicle. In the event the off-center position of a vehicle results in the rear of the vehicle impacting a side member, the foam core or body of the side member is resiliently compressed. When the vehicle is pulled away from an impacted side member, the foam core of the side member causes the side member to substantially recover to its original condition or shape.

Example weather barriers disclosed herein seal a rear edge of a vehicle parked at a loading dock. Some examples weather barriers disclosed herein include a vertically elongate lateral seal that (e.g., automatically) lengthens to (e.g., match) a height of the vehicle's rear cargo door opening. In some examples, the weather barriers disclosed herein includes a strap with an attached spring that pulls or moves an upper seal segment of the lateral seal in engagement with (e.g., up against) the vehicle's upper doorway edge in reaction to the vehicle backing into or engaging the weather barrier (e.g., the strap). The spring provides the strap with a variable overall length (e.g., a vertical length relative to a doorway of a vehicle) to accommodate vehicles of different sizes (e.g., vehicles having different heights and/or widths).

FIGS. 1-13 show an example weather barrier 10 with vehicle-actuated members for sealing or sheltering a vehicle 12 (e.g., truck, trailer, etc.) parked at a loading dock 14 of a building 16. The building 16 includes a wall 18 and a doorway 20 through which cargo is transferred between the vehicle 12 and an interior dock area 22 of the building 16. In the illustrated example, the weather barrier 10 includes side structure assemblies 24 on either side of the doorway 20 and a header structure 26 above the doorway 20. The header structure 26 is horizontally elongate and seals against a roof 28 of the vehicle 12, and the side structures assemblies 24 are (e.g., vertically) elongate and seal against the sides or (e.g., vertical) rear edges 30 of the vehicle 12.

In some examples, the vehicle 12 backing into or engaging the weather barrier 10 in a direction toward doorway 20 causes a lateral seal 32 of each side structure assembly 24 to bend, deflect or otherwise lengthen such that each lateral seal 32 seeks and seals (e.g., engages) the rear edge 30. The rear edge 30 may include, but is not limited to, a rear panel edge 30a, a door edge 30b, and/or an upper rear edge 30c. The lateral seal 32 deflecting outward and/or lengthening to seek (e.g., engage) the rear edge 30c reduces (e.g., minimizes) the seal member's encroachment into and/or obstruction of a cargo passageway 34 running between doorway 20 of building 16 and a rear cargo doorway 36 of vehicle 12.

The cargo passageway 34 is defined as a projection of the doorway 20, where the cargo passageway 34 has a passageway height 38 and a passageway width 40 corresponding to (e.g., equal to) the height 38 and the width 40 of the doorway 20, respectively. The height 38 and the width 40 of the doorway 20 lie along a plane 42 that is generally parallel relative to the wall 18. A line 44 perpendicular to the plane 42 extends parallel to the general direction along which cargo would travel through passageway 34 during a loading/unloading operation. The wall 18 has an exterior surface 46 facing in a forward direction 48 (e.g., the forward direction 48 lies parallel to line 44). The terms "plane" and "line" used herein mean that the plane and the line pertain to geometry as opposed to an actual physical structure.

In some examples, the header structure 26 includes a canopy-like upper support member 50 mounted to the wall 18, above the doorway 20. In the illustrated example, the upper support member 50 has a front bar 52 from which a head curtain 54 hangs pendant in front of the upper portion of the doorway 20. In some examples, a weighted tip seal 56 along a lower edge of the head curtain 54 provides the head curtain 54 with weight to increase a sealing force of the curtain (e.g., in a downward direction) toward or against the roof 28 of the vehicle 12. As the vehicle 12 backs into the dock 14, the head curtain 54 engages or drags up and over the upper rear edge 30c of the vehicle 12 to seal against the roof 28.

To seal along the rear edge 30 of the vehicle 12 (e.g., particularly along the rear vertical edges 30b), the side structure 24 includes a side support member 58 and the lateral seal 32. Although the structural details may vary, the illustrated example shows the lateral seal 32 having an edge-engaging lip 60 running along or positioned adjacent the distal vertical edge 62 of a resiliently flexible sheet or panel 64. A proximal vertical edge 66 of the flexible panel 64 couples or connects to the side support member 58. In this example, the side support member 58 includes a resiliently compressible foam core 68 (e.g., polyurethane foam), a firm backer 70 (e.g., wood or metal), and a pliable cover 72. The term, "pliable" refers to a material that sufficiently flexible to be folded over onto itself without experiencing significant permanent deformation when subsequently unfolded (e.g., elastically deformable material(s)). The foam core 68 is sufficiently firm to support the lateral seal 32 yet has resilient characteristic(s) to endure vehicular impacts (e.g., without becoming damaged). The cover 72 protects the core 68 from abrasion and weather, and the backer 70 mounts or supports the side support member 58 to the wall 18.

In some examples, to seek and seal (e.g., engage) the rear edge 30 of the vehicle 12, the lateral seals 32 deflect laterally and/or lengthen (e.g., vertically in the orientation of FIG. 1) to the position and/or dimensions of the vehicle 12 (e.g., the height and/or width of the rear cargo doorway 36 of the vehicle 12). The movement of the lateral seals 32 is in reaction to the vehicle 12 moving from a departed position at which the vehicle 12 is spaced apart from and not in engagement with the weather barrier 10 as shown for example in FIGS. 1 and 3, to a parked position in front of doorway 20 at which the vehicle 12 is in engagement with weather barrier 10 as shown for example in FIGS. 2 and 7. The vehicle 12 in the departed position causes the weather barrier 10 to move to a relaxed configuration, as shown for example in FIGS. 1, 3, 4 and 12. The vehicle 12 in the parked position forces or causes the weather barrier 10 to move to an activated configuration, as shown for example in FIGS. 2 and 7.

FIGS. 4-7 illustrate an example operation of the weather barrier 10. FIGS. 4-7 are views taken from the perspective of a person 74 standing inside building 16 and looking up toward an upper corner of the doorway 20, as shown for example in FIG. 1. FIGS. 4-7 show an interior surface of the wall 18, a lateral edge 20a of the doorway 20, an upper edge 20b of the doorway 20, an upper exterior rear edge 30c' of the vehicle 12, the vertical rear edge 30b of the vehicle 12, an upper interior rear edge 30c" of the vehicle's open doorway 36, the header's upper support member 50, the header's front bar 52, the head curtain 54, the weighted tip seal 56, a corner membrane 76, the side support member 58, and the lateral seal 32 (including flexible panel 64 and the lip 60). FIGS. 4-7 also show a flexible elongate member 78 having an upper end 80 connected to an anchor (e.g., the front bar 52) and a lower end 82 connected to an upper seal segment 84 of the lip 60 of the lateral seal 32. The anchor can be any structure above the upper seal segment 84 such as, for example, a frame of the header structure 26, a compressible pad (e.g., of a header), and/or any other structure (e.g., a beam extending from the wall 18). The connection between the lower end 82 and the upper seal segment 84 can be via fasteners including, but are not limited to, screws, rivets, staples, the elongate member 78 looped through a horizontal slit in upper seal segment 84, etc.

Figure 4:
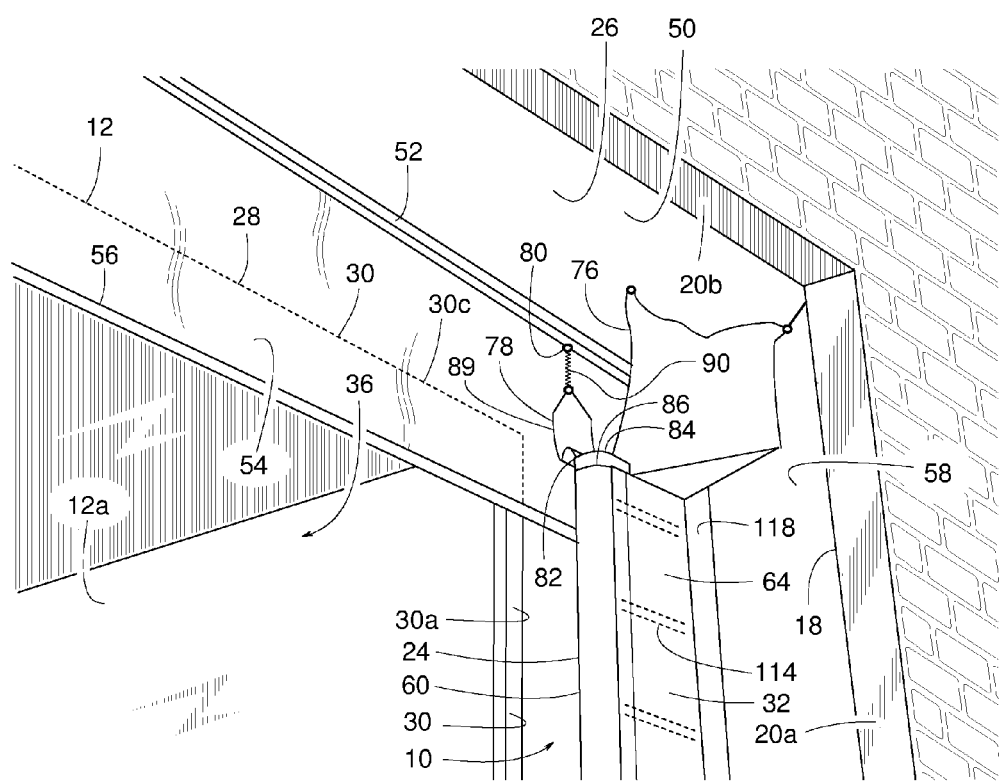
FIG. 4 is a perspective view of the example weather barrier as viewed from the perspective of the person shown in FIG. 1.

FIG. 4 shows the vehicle 12 in a departed position spaced apart from the head curtain 78 and the weather barrier 10 in the relaxed configuration. In the relaxed configuration, the elongate member 78 is slack and in a relaxed condition, which allows the upper seal segment 84 to at least partially move or slide (e.g., downwardly in the orientation of FIG. 4) into a sheath 86 of the lateral seal 32 and/or rest upon a lower seal segment 88 of the lateral seal 32. When the upper seal segment 84 is in the lowered position, as shown in FIG. 4, the elongate member 78 supports little if any (e.g., a negligible amount) of the weight of the upper seal segment 84.

Figure 5:
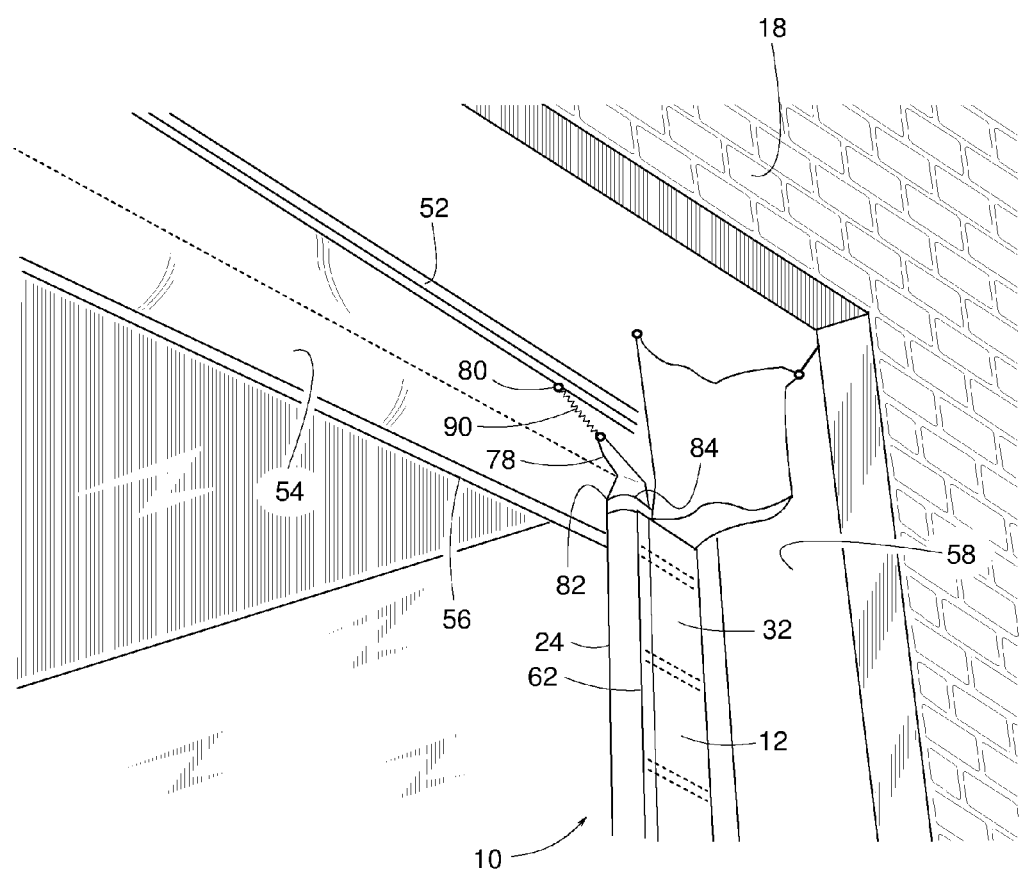
FIG. 5 is a perspective view similar to FIG. 4, but showing the vehicle closer to the doorway of the building.

FIG. 5 shows the vehicle 12 (e.g., initial) contacting or engaging the weather barrier 10. The rear vertical edges 30a and 30b push or move the lateral seal 32 (e.g., back) toward the doorway 20. The upper rear edge 30c bends or deflects the head curtain 54 back and against the elongate member 78, which bends or deflects the elongate member 78. As a result of the elongate member's deflection, the elongate member 78 is no longer slack (e.g., is in tension) and supports most or all of the weight of the upper seal segment 84.

Figure 6:
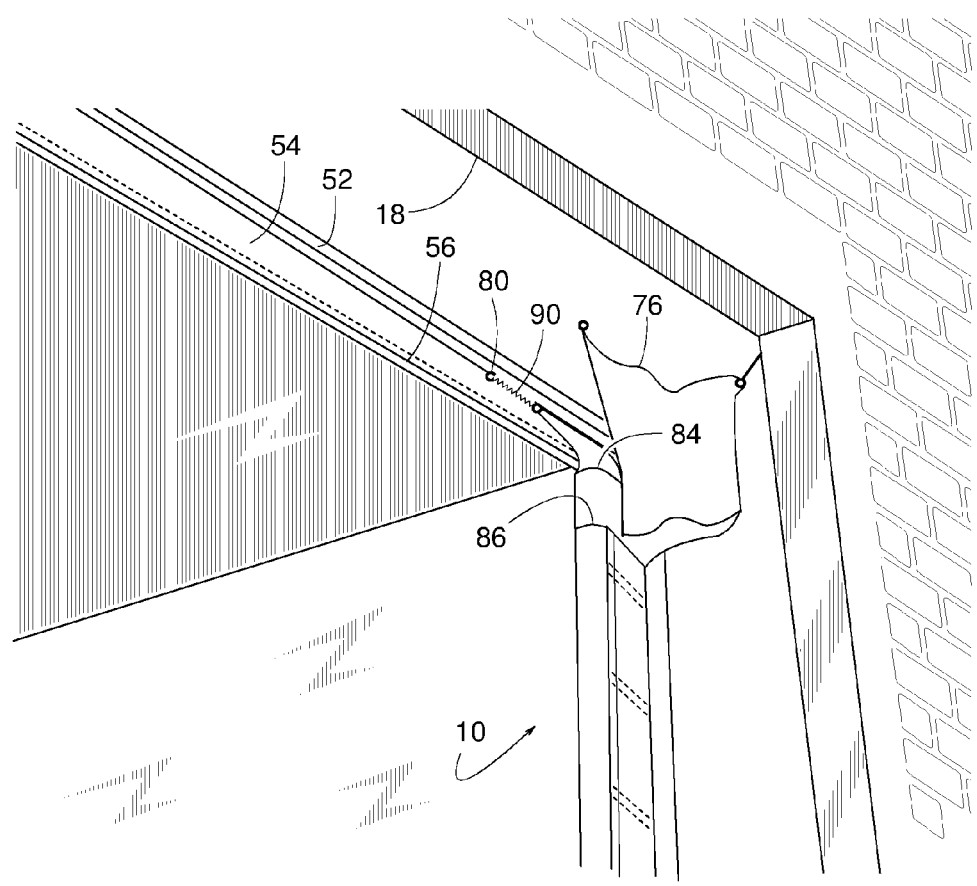
FIG. 6 is a perspective view similar to FIG. 5, but showing the vehicle even closer to the doorway of the building.

FIG. 6 shows vehicle 12 positioned (e.g., backed) farther into the weather barrier 10. This causes head curtain 54 to slide up and across the vehicle's upper rear edge 30c. The position of the vehicle 12 and/or the head curtain 54 on the rear edge 30c causes the elongate member 78 to bend and/or stretch in length (e.g., an axial length). Examples of the elongate member 78 include, but are not limited to, a pliable member, a non-elastic fabric strap, an elastic strap, a cable, a chain, a rope, an elastic cord, a tension spring, and various combinations thereof. In the illustrated example, the elongate member 78 includes a nylon strap 89 and a tension spring 90. As the vehicle 12 backs into the weather barrier 10, tension in the elongate member 78 causes (e.g., pulls) the lateral seal's upper seal segment 84 to move (e.g., upward) toward the vehicle's upper rear edge 30c (e.g., upper interior rear edge 30c"). For example, a force imparted to the elongate member 78 (e.g., the strap 89) via the vehicle 12 causes the elongate member 78 (e.g., the strap 89) to deflect from the relaxed position to the deflected position, which causes the elongate member 78 to pull (e.g., provide a vertical force in the orientation of FIG. 3) to the upper seal segment 84 to cause the upper seal segment 84 to move from the lowered position to the raised position.

In some examples, the upper seal segment 84 reaches a top or upper surface of the vehicle's cargo doorway 36 (e.g., the rear edge 30) before the vehicle 12 reaches a parked position (e.g., a position in which the vehicle 12 is stationary at the loading dock 10 and/or restrained at the loading dock 10). In some such examples, the elongate member 78 or the spring 90 holds the position of the upper seal segment 84 until the vehicle 12 is the parked position. In some examples, the upper seal segment 84 moves or slides from the lowered position to the raised position (e.g., to engage the upper interior rear edge 30c" of the vehicle's cargo doorway 36) between an initial engagement of the vehicle 12 with the elongate member 78 and prior to the vehicle 12 reaching the parked position. The elongate member 78 (e.g., the spring 90 and the strap 89) maintains the upper seal segment 84 in the raised position when the upper seal segment 84 is in the raised position prior to the vehicle 12 reaching in the parked position. In some examples, the upper seal segment 84 moves to the raised position (e.g., a fully raised position) upon the vehicle 12 reaching the parked position.

To cause the elongate member 78 to be engaged by the vehicle 12, the elongate member 78 is positioned between the upper seal segment 84 and the anchor (e.g., the header structure 26) positioned above the upper seal segment 84. To cause the vehicle 12 to engage the elongate member 78, the elongate member 76 spans an area (e.g., a vertical distance or area) through which at least a portion of the vehicle 12 can travel. Thus, the vehicle 12 engages the elongate member 78 when the vehicle 12 moves to the parked position.

FIG. 6 shows the upper seal segment 84 having been pulled partially out from within the sheath 86. However, in some examples, the upper seal segment 84 can remain entirely within or covered by the sheath 86 even though the upper seal segment 84 moves (e.g., is raised) relative to the sheath 86. In some examples, the corner membrane 76 at least partially covers the gap near the vehicle's upper rear corner 30d. The corner membrane 76 can be any pliable sheet of material, examples of which include, but are not limited to, 22-once or 44-once vinyl coated fabric, nylon fabric, polyester fabric, non-fabric plastic sheeting, etc.

Figure 7:
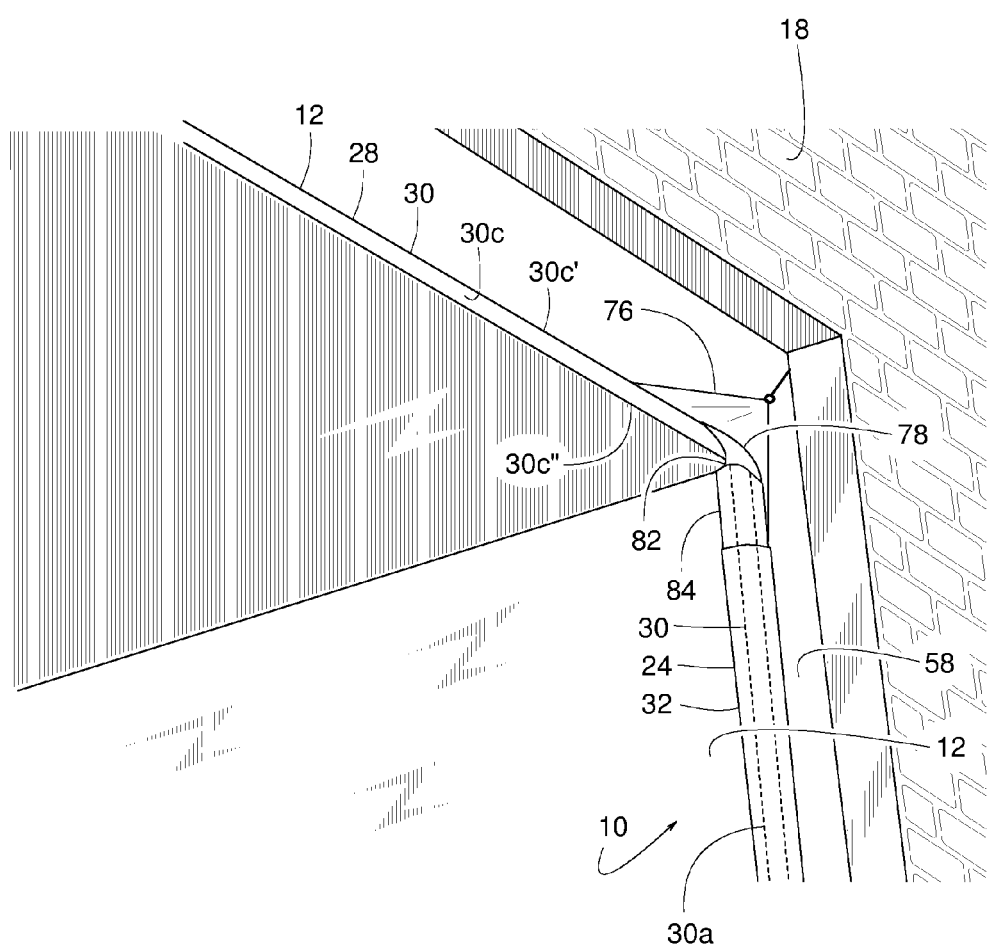
FIG. 7 is a perspective view similar to FIGS. 4-6 but showing the vehicle at its parked position with the example weather barrier in an activated configuration.

FIG. 7 shows vehicle 12 in the parked position with the weather barrier 10 in the activated configuration and the vehicle 12 having caused or forced the elongate member 78 to a deflected position such that the elongate member 78 pulls the lateral seal's upper seal segment 84 farther out from within sheath 86 and up against the upper interior rear edge 30c" of the vehicle's cargo doorway 36 (e.g., causes the upper later seal 84 to move to the raised position). FIG. 7 shows upper seal segment 84 in the raised position (e.g., and the elongate member 78 (e.g., the strap 89 and/or the spring 90) in a deflected position). To accommodate vehicle cargo doorways of various heights, some examples of the elongate member 78 has an elastic length by virtue of spring 90 and/or an elasticity characteristic of the strap 89. Thus, the example upper seal segment 84 adjusts (e.g., vertically) to accommodate various heights of vehicles. For example, the upper seal segment 84 may have a plurality of raised positions, where each raised position of the plurality of raised positions engages (e.g. seals) an upper rear edge of a vehicle's cargo doorway (e.g., the upper interior rear edge 30c" of the vehicle's cargo doorway 36). Thus, in some examples, the upper seal segment 84 moves to the raised position when the upper seal segment 84 engages a rear edge of a vehicle's cargo doorway. In some examples, the sheath 86 has a length such that the upper seal segment 84 remains entirely within sheath 86 regardless of how far the upper seal segment 84 is pulled up and away from the lower seal segment 88. The upper seal segment 84, the lower seal segment 88 and the sheath 86 of the lateral seal 32 are positioned (e.g., cup or curl) around the vehicle's vertical rear edges 30*a* and 30*b* to cover a hinge gap between the vehicle's side panel 12*a* and the vehicle's door edge 30*c*. The corner membrane 76 at least partially covers incidental gaps in the area of the vehicle's upper rear corner 30*d*.

In the illustrated example, as the vehicle 12 backs into the weather barrier 10, the head curtain 54 becomes pinched between the vehicle 12 and the flexible elongate member 78. Thus, the head curtain 54 protects the elongate member 78 from damage or direct abrasion with vehicle 12.

Figure 8:
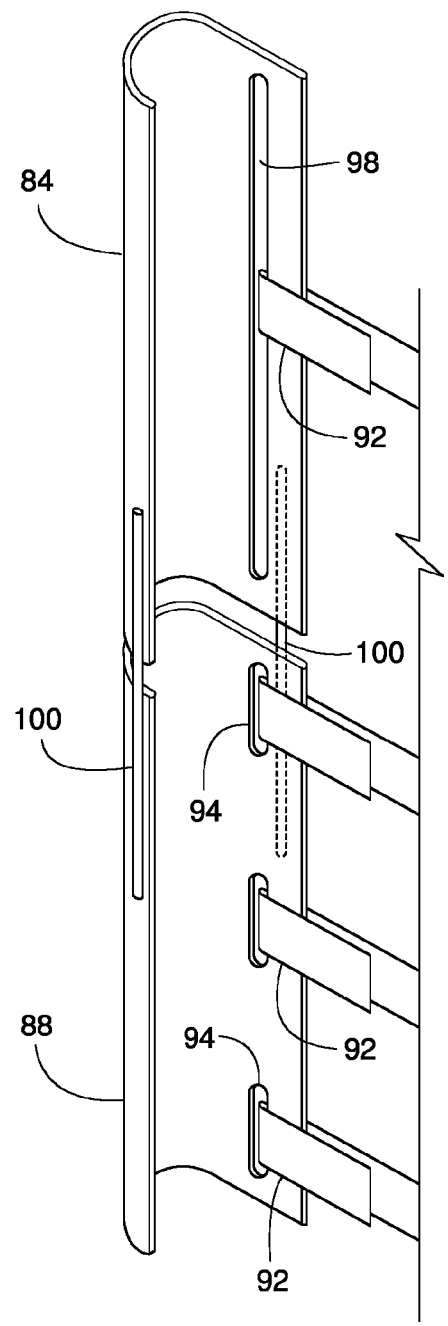
FIG. 8 is a perspective view of example seal segments of the example weather barrier of FIGS. 1-7.
Figure 9:
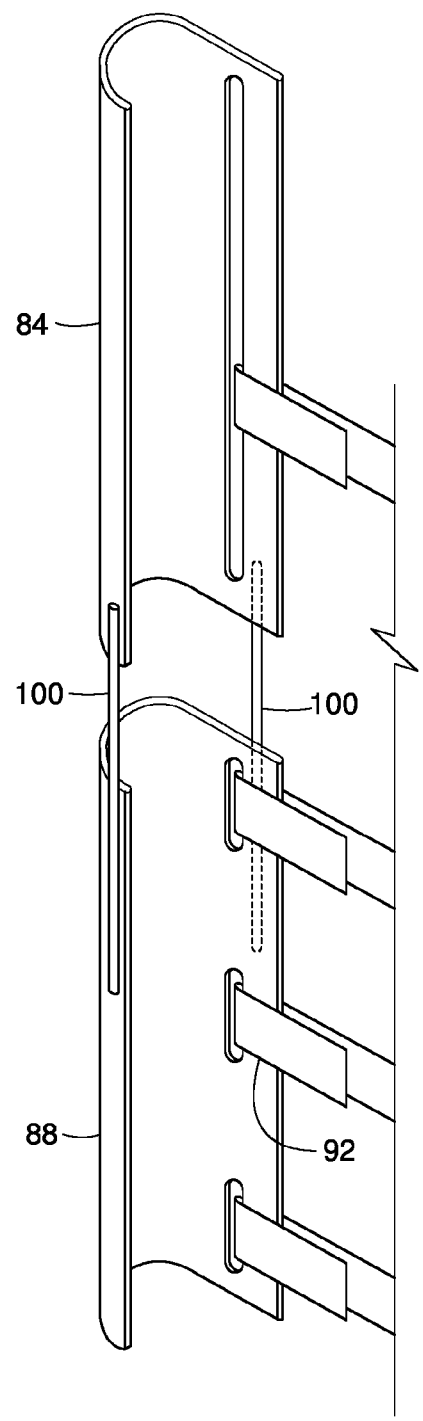
FIG. 9 is a perspective view similar to FIG. 8, but showing the example seal segments spaced farther apart.
Figure 12:
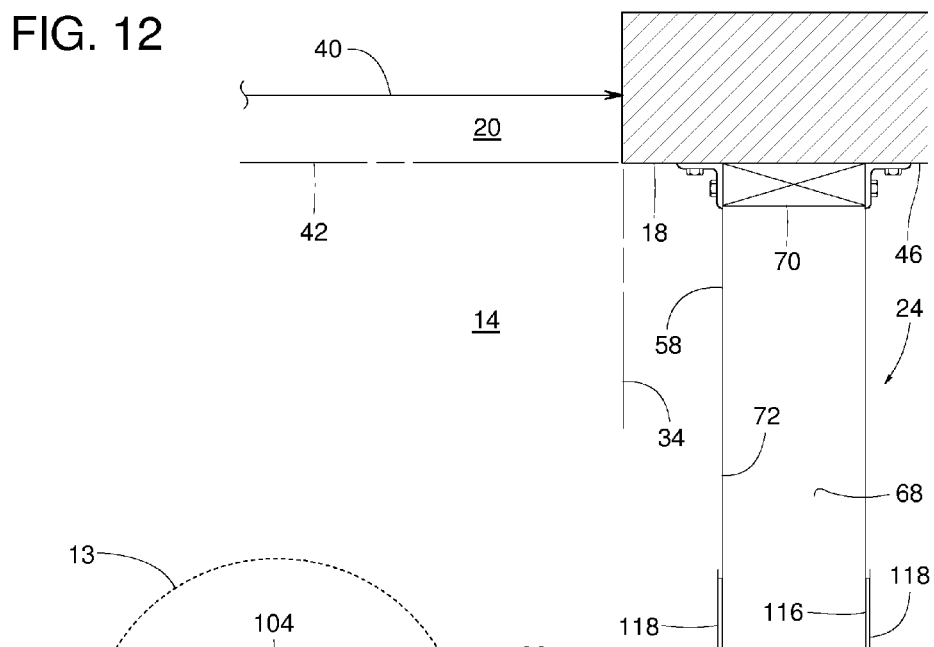
FIG. 12 is a cross-sectional view taken along line 12-12 of FIG. 1.
Figure 13:
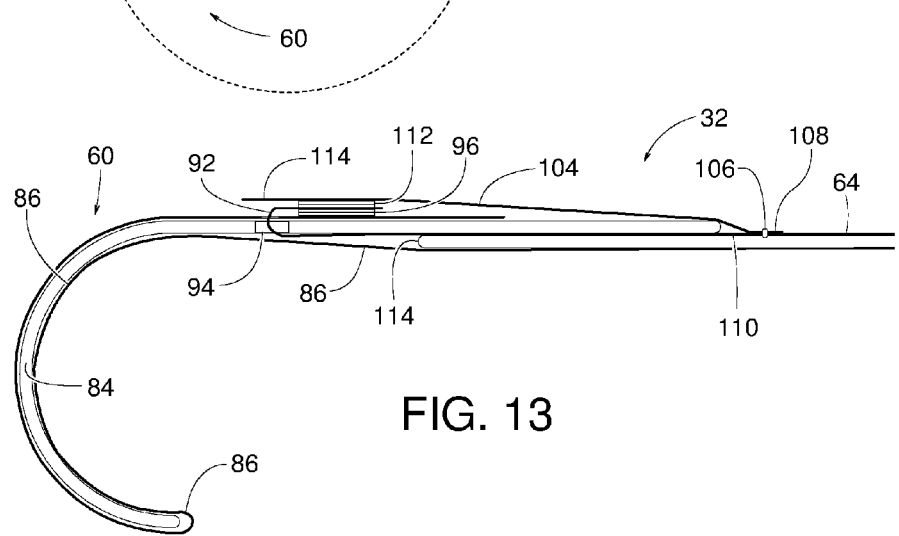
FIG. 13 is an enlarged view of FIG. 12.

FIGS. 8-13 show example structural details of the lateral seal 32. In the example of FIGS. 8 and 9, the upper seal segment 84 and the lower seal segment 88 are formed of resiliently flexible but not pliable material. Example materials of the seal segments 84 and 88 include, but are not limited to, 1/16"-1/8" thick UHMW (ultra high molecular weight polyethylene), other plastics, materials of other thicknesses, spring steel, and/or various combinations of materials. For enhanced sealing, the seal segments 84 and 88 are wrapped within sheath 86 (FIGS. 12 and 13), which is pliable and more flexible than the seal segments 84 and 88. Example sheath materials include, but are not limited to, 22-once or 44-once vinyl coated fabric, nylon fabric, polyester fabric, non-fabric plastic sheeting, etc. To fasten or couple the lower seal segment 88 to the sheath 86, a plurality of fabric loops 92 (e.g., straps) pass through (e.g., an equal) plurality of slits 94 in the lower seal segment 88. The loops 92 are held or fixed in place via a fastener, examples of which include, but are not limited to, a touch-and-hold fastener 96 (e.g., VELCRO, which is a registered trademark of Velcro Industries, of Manchester, N.H.), sewn seam, snaps, clips, buttons, ultrasonic welding, adhesive, and/or various combinations thereof.

To fasten or couple the upper seal segment 84 to the sheath 86, at least one fabric loop 92 passes through a (e.g., vertically) elongate slit 98 in the upper seal segment 84. The lower end 82 of the elongate member 78 is fastened to the upper end of the upper seal segment 84. When the elongate member 78 pulls the upper seal segment 84 upward in reaction to the vehicle 12 backing into the weather barrier 10, the length of the slit 98 allows the upper seal segment 84 to slide (e.g., vertically) relative to the upper loop 92, the sheath 86 and the lower seal segment 88. Such sliding motion allows the lateral seal 32 to lengthen (e.g., vertically) relative to (e.g., to match) a height of the vehicle's rear cargo doorway 36. In other words, the lateral seal 32 has a first overall length between a first end adjacent the ground and a second end adjacent the head structure 26 when the weather barrier 10 is in the relaxed configuration that is less than a second overall length of the lateral seal 32 when the weather barrier 10 is in the activated configuration. In addition, the upper seal segment 84 moves or slides (e.g., vertically) relative to the lower seal segment 88 to cause the upper seal segment 84 to engage the upper rear edge 30*c* and/or the upper rear corner 30*d* of the vehicle 12 when the weather barrier 10 is in the activated configuration.

In some examples, a plurality of stays 100 are attached to the sheath 86 to increase the stiffness of the sheath 86 near an area between the seal segments 84 and 88. In some examples, the stays 100 are held within fabric sleeves or vertically elongate pockets sewn to the sheath 86. In the illustrated example, the upper seal segment 84 can move (e.g., vertically) relative to the stays 100 while the stays 100 remain substantially stationary (e.g., fixed in position) relative to the lower seal segment 88 and the sheath 86. Example materials of the stays 100 include, but are not limited to, fiberglass, steel, and other materials that are stiffer than the material of the sheath 86.

In addition or alternatively, some examples of the lateral seal 32, as shown in FIGS. 10 and 11, include a lap segment 102 that spans the vertical gap between the seal segments 84 and 88. The lap segment 102 guides the (e.g., vertical) sliding motion of the upper seal segment 84. In some examples, the lap segment 102 is made of a material similar to that of the segments 84 and 88. In some examples, the lap segment 102 is thinner than the segments 84 and 88 to reduce (e.g., minimize) the bulk or dimensional envelope of an overlapping joint between the lap segment 84 and at least one of the adjacent seal segments 84 or 88. In the illustrated example, the lap segment 102 is stapled or otherwise fastened to the lower seal segment 88 while the upper seal segment 84 is free to slide (e.g., vertically) relative to the lower seal segment 88 and the lap segment 102. In other examples, the lap segment 102 is stapled or otherwise fastened to the lower end of the upper seal segment 84 and is free to slide vertically relative to lower seal segment 88.

To hold the loops 92 in place or in a fixed position, some examples of the lateral seal 32 includes a fabric flap 104 that overlies the loops 92. In some examples, a threaded seam 106 fastens one edge 108 of the flap 104 to a sheet portion 110 of the lateral seal 32, and a touch-and-hold fastener 112 fastens an opposite edge 114 of the flap 104 to the sheath 86 and the loops 92. In some examples, the sheet portion 110 is made of a material similar to the sheath 86. In some examples, the sheet portion 110 is an integral extension of the sheath 86. In some examples, a plurality of vertically spaced apart stays 114 are fastened to the sheet portion 110 of the lateral seal 32. The stays 114 are stiffer than the sheet portion 110 to provide the lateral seal 32 with resilient flexibility in the area between the side support member 58 and the lip 60. In some examples, the touch-and-hold fasteners 116 connect the flap 118 of the lateral seal 32 to the side support member 58. Example materials of the stays 114 include, but are not limited to, fiberglass, steel, and other materials of similar flexibility and resilience.

Figure 14:
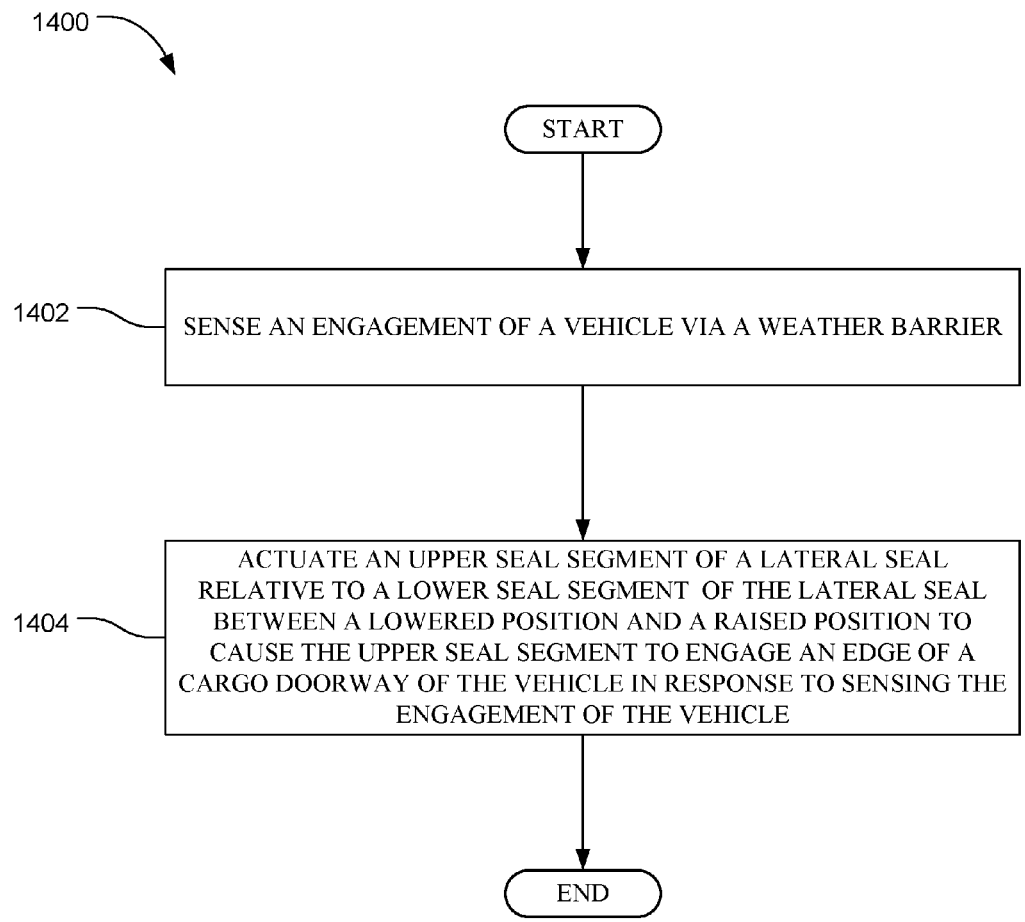
FIG. 14 is an example method of operating an example weather barrier disclosed herein.

FIG. 14 is a flowchart of an example method 1400 of operating an example weather barrier such as, for example, the weather barrier 10 of FIGS. 1-13. While an example manner of operation of the example weather barrier 10 has been illustrated in FIG. 14, one or more of the steps and/or processes illustrated in FIG. 14 may be combined, divided, re-arranged, omitted, eliminated and/or implemented in any other way. Further still, the example method of FIG. 14 may include one or more processes and/or steps in addition to, or instead of, those illustrated in FIG. 14, and/or may include more than one of any or all of the illustrated processes and/or steps. Further, although the example method is described with reference to the flow chart illustrated in FIG. 14, many other methods of operating the weather barrier of FIGS. 1-13 may alternatively be used. The weather barrier 10 of the illustrated example senses an engagement of the vehicle 12 with the weather barrier 10 (block 1402). For example, to sense the engagement of the vehicle 12, the weather barrier 10 of the illustrated example includes the elongate member 78. For example, the elongate member 78 deflects between a relaxed position and a deflected position when the vehicle 12 engages the elongate member 78. The elongate member 78 deflects between the relaxed position when a vehicle is not in engagement with the elongate member 78 and the deflected position when the vehicle 12 engages the elongate member 78 because the lower end 82 of the elongate member 78 is coupled to the upper seal segment 84 and the upper end 80 is coupled to an anchor positioned above the upper seal segment 84.

In response to sensing the engagement of the vehicle 12 with the weather barrier 12, the upper seal segment 84 of the lateral seal 32 is actuated relative to the lower seal segment 86 of the lateral seal 32 between the lowered position and the raised position to cause the upper seal segment 84 to engage an edge (e.g., the rear edge 30) of the cargo doorway 36 of the vehicle 12 (block 1404). For example, the weather barrier 10 of the illustrated example actuates the upper seal segment 84 relative to the lower seal segment 86 via the deflection of the elongate member 78. For example, in response to the elongate member 78 deflecting between the relaxed position and the deflected position, the elongate member 78 actuates the upper seal segment 84 by pulling the upper seal member 84 in a direction away from the lower seal member 86 (e.g., in a vertical direction). In turn, the upper seal member 84 of the illustrated example slides relative to the lower seal segment 86 to engage (e.g., the rear edge 30) of the vehicle 12.

At least some of the aforementioned examples include one or more features and/or benefits including, but not limited to, the following:

In some examples, a weather barrier includes a header structure to couple to a wall of a loading dock. In some such examples, the header structure is horizontally elongate, extending above a doorway of the wall, and protruding in a forward direction from the wall. In some such examples, a lateral seal is to couple to the wall. In some such examples, the lateral seal is vertically elongate and extends below the header structure. In some such examples, the lateral seal includes an upper seal segment and a lower seal segment. In some such examples, the upper seal segment moves between a lowered position and a raised position relative to the lower seal segment. In some such examples, a flexible elongate member has an upper end coupled to the header structure and a lower end coupled to the upper seal segment. In some such examples, the flexible elongate member deflects from a relaxed position to a deflected position. In some such examples, the upper seal segment moves from the lowered position to the raised position in response to the flexible elongate member deflecting from the relaxed position to the deflected position.

In some examples, the flexible elongate member supports more weight of the upper seal segment when the upper seal segment is in the raised position than when the upper seal segment is in the lowered position.

In some examples, the flexible elongate member is pliable.

In some examples, the flexible elongate member includes a strap.

In some examples, the flexible elongate member has an elastic length extending between the upper end and the lower end of the flexible elongate member.

In some examples, the lower end of the flexible elongate member is to rise and move closer to the header when the flexible elongate member deflects from the relaxed position to the deflected position.

In some examples, the header structure includes a head curtain to seal against a vehicle, and the head curtain to be pinched between the vehicle and the flexible elongate member when the vehicle is in a parked position.

In some examples, the weather barrier includes a sheath to receive the upper seal segment and the lower seal segment.

In some examples, the weather barrier includes a sheath to receive the upper seal segment and the lower seal segment, the sheath composed of a pliable material that is more flexible than both the upper seal segment and the lower seal segment.

In some examples, the weather barrier includes a sheath into which both the upper seal segment and the lower seal segment extend, where the sheath is composed of a pliable material that is more flexible than both the upper seal segment and the lower seal segment. In some such examples, the weather barrier includes a plurality of stays that are vertically elongate and stiffer than the pliable material, the plurality of stays being attached to the sheath.

In some examples, the weather barrier includes a sheath into which both the upper seal segment and the lower seal segment extend, and the upper seal segment slides substantially vertically within the sheath as the upper seal segment moves between the lowered position and the raised position.

In some examples, the weather barrier includes a sheath into which both the upper seal segment and the lower seal segment extend, the upper seal segment to extend beyond the sheath when the upper seal segment in the raised position.

In some examples, a tension lengthwise along the flexible elongate member is to cause the upper seal segment to engage a vehicle when the weather barrier is in an activated configuration.

In some examples, the lateral seal includes a lap segment overlapping the upper seal segment and the lower seal segment.

In some examples, the upper seal segment includes a vertically elongate slit and the weather barrier further comprising includes: a sheath into which both the upper seal segment and the lower seal segment extend, and a loop extending through the vertically elongate slit to fasten the sheath to the upper seal segment, the upper seal segment being vertically movable relative to the loop.

In some examples, the lower seal segment includes a plurality of vertically elongate slits, and the weather barrier further includes a sheath into which both the upper seal segment and the lower seal segment extend and a plurality of loops extending through the plurality of vertically elongate slits and fastening the sheath to the lower seal segment.

In some examples, the lower seal segment defines a plurality of vertically elongate slits and the weather barrier further includes: a sheath into which both the upper seal segment and the lower seal segment extend; a plurality of loops extending through the plurality of vertically elongate slits and fastening the sheath to the lower seal segment; and a flap overlapping the plurality of loops such that at least a portion of the plurality of loops is positioned between the flap and the lower seal segment.

In some examples, a weather barrier includes a header structure coupled to the wall, the header structure being horizontally elongate, extending above the doorway, and protruding in the forward direction from the wall. In some such examples, a lateral seal is to couple to the wall. In some such examples, the lateral seal is vertically elongate and extends below the header structure, the lateral seal to extend farther into the cargo passageway when the weather barrier is in the relaxed configuration than when the weather barrier is in the activated configuration. The lateral seal is to engage the vehicle when the vehicle is in the parked position, the lateral seal including an upper seal segment, a lower seal segment, and a sheath the upper seal segment and the lower seal segment to extend into the sheath, and the upper seal segment to move within the sheath between a lowered position and a raised position relative to the lower seal segment and the sheath.

In some examples, the weather barrier includes a flexible elongate member having an upper end coupled to the header structure and a lower end coupled to the upper seal segment. The flexible elongate member is to deflect from a relaxed position to a deflected position. The upper seal segment is to move from the lowered position to the raised position in response to the flexible elongate member deflecting from the relaxed position to the deflected position.

In some examples, the flexible elongate member is pliable.

In some examples, the flexible elongate member includes a strap.

In some examples, the flexible elongate member has an elastic length extending between the upper end and the lower end of the flexible elongate member.

In some examples, the lower end of the flexible elongate member is to move closer to an upper edge of the doorway upon deflecting from the relaxed position to the deflected position.

In some examples, the header structure includes a head curtain to sealing contact the vehicle when the vehicle is in the parked position, and the head curtain is to be pinched between the vehicle and the flexible elongate member when the vehicle is in the parked position.

In some examples, the sheath includes a pliable material that is more flexible than both the upper seal segment and the lower seal segment.

In some examples, the weather barrier includes a plurality of vertically elongate stays attached to the sheath, the plurality of vertically elongate stays being stiffer than the sheath.

In some examples, the upper seal segment is to extend beyond the sheath when the upper seal segment is in the raised position.

In some examples, tension lengthwise along the flexible elongate member is to cause the upper seal segment to move up against the vehicle when the weather barrier is in the activated configuration.

In some examples, the lateral seal includes a lap segment overlapping the upper seal segment and the lower seal segment.

In some examples, the upper seal segment includes a vertically elongate slit and the weather barrier further includes a loop extending through the vertically elongate slit to fasten the sheath and the upper seal segment, the upper seal segment being vertically movable relative to the loop.

In some examples, the lower seal segment includes a plurality of vertically elongate slits and the weather barrier further includes a plurality of loops extending through the plurality of vertically elongate slits to fasten the sheath and the lower seal segment.

In some examples, the lower seal segment includes a plurality of vertically elongate slits, and the weather barrier further includes: a plurality of loops extending through the plurality of vertically elongate slits to fasten the sheath and the lower seal segment; and a flap overlapping the plurality of loops such that at least a portion of the plurality of loops is positioned between the flap and the lower seal segment.

In some examples, a weather barrier includes a header structure coupled to the wall. The header structure is horizontally elongate, extending above the doorway, and protruding away from the wall. In some such examples, a lateral seal is to couple to the wall. The lateral seal is vertically elongate and is to extend below the header structure. In some such examples, the lateral seal extends farther into the cargo passageway when the weather barrier is in a relaxed configuration than when the weather barrier is in an activated configuration. In some such examples, the lateral seal including an upper seal segment and a lower seal segment, the upper seal segment being movable between a lowered position and a raised position relative to the lower seal segment. In some such examples, a flexible elongate member having an upper end to couple to the header structure and a lower end to couple to the upper seal segment, the flexible elongate member to deflect between a relaxed position and a deflected position. In some such examples, the upper seal segment to move from the lowered position to the raised position in response to the flexible elongate member deflecting from the relaxed position to the deflected position. In some such examples, the flexible elongate member has a strap to provide an elastic length between the upper end and the lower end of the flexible elongate member. In some such examples, the lower end of the flexible elongate member to move toward an edge of the doorway upon deflecting from the relaxed position to the deflected position. In some such examples, a sheath at least partially receives the upper seal segment and the lower seal segment. In some such examples, the sheath includes a pliable material that is more flexible than the upper seal segment and the lower seal segment. In some such examples, the upper seal segment to slide substantially vertically within the sheath as the upper seal segment moves between the lowered position and the raised position. In some such examples, tension lengthwise along the flexible elongate member is to cause the upper seal segment to engage the vehicle when the weather barrier is in the activated configuration.

In some examples, the header structure includes a head curtain that is to seal against a vehicle when the vehicle is in a parked position, the head curtain becoming pinched between the vehicle and the flexible elongate member as the vehicle approaches the parked position.

In some examples, the lateral seal includes a lap segment overlapping both the upper seal segment and the lower seal segment.

In some examples, the upper seal segment defines a vertically elongate slit and the weather barrier further includes a loop extending through the vertically elongate slit, the loop to fasten the sheath to the upper seal segment, the upper seal segment being vertically movable relative to the loop.

In some examples, the lower seal segment defines a plurality of vertically elongate slits, and the weather barrier further including a plurality of loops to extend through the plurality of vertically elongate slits to fasten the sheath and the lower seal segment.

In some examples, the lower seal segment includes a plurality of vertically elongate slits and the weather barrier further includes: a plurality of loops extending through the plurality of vertically elongate slits to fasten the sheath and the lower seal segment; and a flap overlapping the plurality of loops such that at least a portion of the plurality of loops is positioned between the flap and the lower seal segment.

In some examples, a weather barrier includes a lateral seal to couple to the wall. In some examples, the lateral seal includes an upper seal segment and a lower seal segment. In some examples, the upper seal segment slides between a lowered position and a raised position relative to the lower seal segment. In some such examples, a flexible elongate member has an upper end coupled to an anchor and a lower end coupled to the upper seal segment. The flexible elongate member deflects from a relaxed position to a deflected position in response to a force imparted to the flexible elongate member when a vehicle engages the flexible elongate member. In some such examples, deflection of the flexible member from the relaxed position to the deflected position is to cause the upper seal segment to move from the lowered position to the raised position to cause the upper seal segment to engage an edge of a cargo doorway of the vehicle.

In some examples, the flexible elongate member is to move from the deflected position to the relaxed position in response to the vehicle releasing flexible elongate member.

In some examples, the flexible elongate member moving from the deflected position to the relaxed position is to cause the lateral seal is to move from the raised position to the lowered position.

In some examples, a weather barrier at least partially seals or shelters a vehicle parked at a loading dock of a building that has a doorway in a wall, where the vehicle is to engage the weather barrier when the vehicle is in a parked position, and the vehicle is to be spaced from the weather barrier when the vehicle is in a departed position. In some such examples, the weather barrier includes a lateral seal to couple to the wall. In some such examples, the lateral seal includes an upper seal segment and a lower seal segment. In some such examples, the upper seal segment is to slide between a lowered position and a raised position relative to the lower seal segment. In some such examples, a flexible elongate member includes a biasing element to couple the upper seal segment and a frame positioned above the upper seal segment. In some such examples, deflection of the flexible elongate member as the vehicle moves toward the parked position is to cause the flexible elongate member to move between a relaxed position and a deflected position. In some such examples, movement of the flexible elongate member between the relaxed position and the deflected position is to cause the upper seal segment to move between the lowered position and the raised position. In some such examples, the upper seal segment is to move from the lowered position to the raised position prior to the vehicle reaching the parked position. In some examples, the biasing element is to maintain the upper seal segment in the raised position when the upper seal segment is in the raised position prior to the vehicle being in the parked position.

In some examples, the upper seal segment engages an upper surface of a cargo doorway of the vehicle before the vehicle is in the parked position.

In some examples, the biasing element includes a spring coupled to a strap, the spring having a first end to couple to the frame and the strap having a second end to couple to the upper seal segment.

In some examples, the spring is a tension spring.

In some examples, a method includes sensing an engagement of the vehicle with a weather barrier at the loading dock, the weather barrier including a lateral side seal. In some such examples, in response to sensing the engagement of the vehicle with the weather barrier, the method actuating an upper seal segment of the lateral seal relative to a lower seal segment of the lateral seal between a lowered position and a raised position to cause the upper seal segment to engage an edge of a cargo doorway of the vehicle.

In some examples, the sensing of the engagement of the vehicle includes deflecting a flexible elongate member between a relaxed position and a deflected position via the vehicle engaging the flexible elongate member, the flexible elongate member having a first end coupled to the upper seal segment and second end coupled to an anchor positioned above the upper seal segment.

In some examples, the actuating of the upper seal segment relative to the lower seal segment includes sliding the upper seal segment relative to the lower seal segment via the flexible elongate member deflecting between the relaxed position and the deflected position.

In some examples, the sensing of the engagement of the vehicle includes deflecting a strap between a relaxed position and a deflected position via the vehicle engaging the strap, the strap having a first end coupled to the upper seal segment and second end coupled to a first end of a spring, a second end of the spring coupled to an anchor positioned above the upper seal segment.

In some examples, the actuating of the upper seal segment relative to the lower seal segment includes sliding the upper seal segment relative to the lower seal segment via the strap deflecting between the relaxed position and the deflected position.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A weather barrier comprising:
a header structure to couple to a wall of a loading dock, the header structure being horizontally elongate, extending above a doorway of the wall and protruding in a forward direction from the wall, the header structure including upper support structure to mount to the wall of the loading dock;
a lateral seal to couple to the wall, the lateral seal being vertically elongate and extending below the upper support structure of the header structure, an upper edge of the lateral seal to move relative to the upper support structure, the lateral seal including an upper seal segment and a lower seal segment, the upper seal segment to move between a lowered position and a raised position relative to the lower seal segment, the upper seal segment defining at least a portion of an uppermost edge of the lateral seal when the upper edge segment is in the raised position; and
a flexible elongate member having an upper end to couple to the header structure and a lower end coupled to the upper seal segment, the flexible elongate member to deflect from a relaxed position to a deflected position, the upper seal segment to move from the lowered position to the raised position in response to the flexible elongate member deflecting from the relaxed position to the deflected position.

2. The weather barrier of claim 1, wherein the flexible elongate member supports more weight of the upper seal segment when the upper seal segment is in the raised position than when the upper seal segment is in the lowered position.

3. The weather barrier of claim 1, wherein the flexible elongate member is pliable.

4. The weather barrier of claim 1, wherein the flexible elongate member includes a strap.

5. The weather barrier of claim 1, wherein the flexible elongate member has an elastic length extending between the upper end and the lower end of the flexible elongate member.

6. The weather barrier of claim 1, wherein the lower end of the flexible elongate member is to rise and move closer to the header when the flexible elongate member deflects from the relaxed position to the deflected position.

7. The weather barrier of claim 1, wherein the header structure includes a head curtain to seal against a vehicle, and the head curtain to be pinched between the vehicle and the flexible elongate member when the vehicle is in a parked position.

8. The weather barrier of claim 1, further including a sheath to receive the upper seal segment and the lower seal segment.

9. The weather barrier of claim 1, further including a sheath to receive the upper seal segment and the lower seal segment, the sheath composed of a pliable material that is more flexible than both the upper seal segment and the lower seal segment.

10. The weather barrier of claim 1, further including:
a sheath into which both the upper seal segment and the lower seal segment extend, the sheath being composed of a pliable material that is more flexible than both the upper seal segment and the lower seal segment; and
a plurality of stays that are vertically elongate and stiffer than the pliable material, the plurality of stays being attached to the sheath.

11. The weather barrier of claim 1, further including a sheath into which both the upper seal segment and the lower seal segment extend, and the upper seal segment slides substantially vertically within the sheath as the upper seal segment moves between the lowered position and the raised position.

12. The weather barrier of claim 1, further including a sheath into which both the upper seal segment and the lower seal segment extend, the upper seal segment to extend beyond the sheath when the upper seal segment is in the raised position.

13. The weather barrier of claim 1, wherein a tension lengthwise along the flexible elongate member is to cause the upper seal segment to engage a vehicle when the weather barrier is in an activated configuration.

14. The weather barrier of claim 1, wherein the lateral seal includes a lap segment overlapping the upper seal segment and the lower seal segment.

15. The weather barrier of claim 1, wherein the lower seal segment includes a plurality of vertically elongate slits and the weather barrier further includes:
a sheath into which both the upper seal segment and the lower seal segment extend; and
a plurality of loops extending through the plurality of vertically elongate slits and fastening the sheath to the lower seal segment.

16. The weather barrier of claim 1, wherein a vertical distance between an upper edge of the lateral seal and the header structure is greater when the upper seal segment is in the lowered position than when the upper seal segment is in the raised position.

17. A weather barrier comprising:
a header structure to couple to a wall of a loading dock, the header structure being horizontally elongate, extending above a doorway of the wall, and protruding in a forward direction from the wall;
a lateral seal to couple to the wall, the lateral seal being vertically elongate and extending below an upper support of the header structure, the lateral seal including an upper seal segment and a lower seal segment, the upper seal segment to move between a lowered position and a raised position relative to the lower seal segment,
a flexible elongate member having an upper end to couple to the header structure and a lower end coupled to the upper seal segment, the flexible elongate member to deflect from a relaxed position to a deflected position, the upper seal segment to move from the lowered position to the raised position in response to the flexible elongate member deflecting from the relaxed position to the deflected position, wherein the upper seal segment includes a vertically elongate slit and the weather barrier further includes:
a sheath into which both the upper seal segment and the lower seal segment extend; and
a loop extending through the vertically elongate slit to fasten the sheath to the upper seal segment, the upper seal segment being vertically movable relative to the loop.

18. A weather barrier comprising:
a header structure to couple to a wall of a loading dock, the header structure being horizontally elongate, extending above a doorway of the wall, and protruding in a forward direction from the wall;
a lateral seal to couple to the wall, the lateral seal being vertically elongate and extending below an upper support of the header structure, the lateral seal including an upper seal segment and a lower seal segment, the upper seal segment to move between a lowered position and a raised position relative to the lower seal segment;
a flexible elongate member having an upper end to couple to the header structure and a lower end coupled to the upper seal segment, the flexible elongate member to deflect from a relaxed position to a deflected position, the upper seal segment to move from the lowered position to the raised position in response to the flexible elongate member deflecting from the relaxed position to the deflected position, wherein the lower seal segment defines a plurality of vertically elongate slits and the weather barrier further includes:
a sheath into which both the upper seal segment and the lower seal segment extend;
a plurality of loops extending through the plurality of vertically elongate slits and fastening the sheath to the lower seal segment; and
a flap overlapping the plurality of loops such that at least a portion of the plurality of loops is positioned between the flap and the lower seal segment.

19. A weather barrier comprising:
a lateral seal to couple to a wall, the lateral seal including an upper seal segment and a lower seal segment, the upper seal segment to slide between a lowered position and a raised position relative to the lower seal segment, an upper edge of the upper seal segment defining at least a portion of an uppermost edge of the lateral seal when the upper seal segment is in the raised position; and
a flexible elongate member having an upper end to couple to an anchor above the upper seal segment and a lower end coupled to the upper seal segment, the flexible elongate member to deflect from a relaxed position to a deflected position in response to a force imparted to the flexible elongate member when a vehicle engages the flexible elongate member, deflection of the flexible elongate member from the relaxed position to the deflected position is to cause the upper seal segment to move from the lowered position to the raised position to cause the upper seal segment to engage an upper edge of a cargo doorway of the vehicle, the upper edge of the lateral seal to be at a lower elevation relative to the upper edge of the cargo doorway when the flexible elongate member is in the relaxed position.

20. The weather barrier of claim 19, wherein the flexible elongate member is to move from the deflected position to the relaxed position in response to the vehicle releasing the flexible elongate member.

21. The weather barrier of claim 20, wherein the flexible elongate member moving from the deflected position to the relaxed position is to cause the lateral seal to move from the raised position to the lowered position.

22. A weather barrier for at least partially sealing or sheltering a vehicle parked at a loading dock of a building that has a doorway in a wall, the vehicle to engage the weather barrier when the vehicle is in a parked position, and the vehicle to be spaced from the weather barrier when the vehicle is in a departed position, the weather barrier comprising:
a lateral seal to couple to the wall, the lateral seal including an upper seal segment and a lower seal segment, the upper seal segment to slide between a lowered position and a raised position relative to the lower seal segment, wherein a lower end of the upper seal segment being spaced from an upper end of the lower seal segment when the upper seal segment is in the raised position; and
a flexible elongate member including a biasing element to couple the upper seal segment and a frame positioned above the upper seal segment, deflection of the flexible elongate member as the vehicle moves toward the parked position is to cause the flexible elongate member to move between a relaxed position and a deflected position, movement of the flexible elongate member between the relaxed position and the deflected position is to cause the upper seal segment to move between the lowered position and the raised position, the upper seal segment to move from the lowered position to the raised position prior to the vehicle reaching the parked position, the biasing element to maintain the upper seal segment in the raised position prior to the vehicle being in the parked position.

23. The weather barrier of claim 22, wherein the upper seal segment engages an upper surface of a cargo doorway of the vehicle before the vehicle is in the parked position.

24. The weather barrier of claim 22, wherein the biasing element includes a spring coupled to a strap, the spring having a first end to couple to the frame and the strap having a second end to couple to the upper seal segment.

25. The weather barrier of claim 24, wherein the spring is a tension spring.

26. The weather barrier of claim 22, wherein the lower end of the upper seal segment being engaged with the upper end of the lower seal segment when the upper seal segment is in the lowered position.

* * * * *